(12) United States Patent
Kollmann et al.

(10) Patent No.: US 10,372,976 B2
(45) Date of Patent: Aug. 6, 2019

(54) PERSON DETECTION IN A MARINE ENVIRONMENT

(71) Applicant: Brunswick Corporation, Lake Forest, IL (US)

(72) Inventors: Troy J. Kollmann, Mt. Calvary, WI (US); Jon M. Nowick, Milwaukee, WI (US)

(73) Assignee: Brunswick Corporation, Lake Forest, IL (US)

( * ) Notice: Subject to any disclaimer, the term of this patent is extended or adjusted under 35 U.S.C. 154(b) by 198 days.

(21) Appl. No.: 15/147,181

(22) Filed: May 5, 2016

(65) Prior Publication Data

US 2017/0323154 A1    Nov. 9, 2017

(51) Int. Cl.
| | |
|---|---|
| *G06K 9/00* | (2006.01) |
| *G06K 9/62* | (2006.01) |
| *B63J 99/00* | (2009.01) |
| *G06K 9/66* | (2006.01) |
| *G06K 9/46* | (2006.01) |

(Continued)

(52) U.S. Cl.
CPC .......... *G06K 9/00362* (2013.01); *B63J 99/00* (2013.01); *G06K 9/00624* (2013.01); *G06K 9/00832* (2013.01); *G06K 9/4628* (2013.01); *G06K 9/6256* (2013.01); *G06K 9/6277* (2013.01); *G06K 9/66* (2013.01); *G06N 3/02* (2013.01); *G06T 7/70* (2017.01); *B63J 2099/006* (2013.01);

(Continued)

(58) Field of Classification Search
None
See application file for complete search history.

(56) References Cited

U.S. PATENT DOCUMENTS

| | | | | |
|---|---|---|---|---|
| 5,282,013 A | * | 1/1994 | Gregoris | ............... F41G 7/2226 244/3.16 |
| 5,751,344 A | * | 5/1998 | Schnee | ................... B63B 45/02 348/113 |

(Continued)

FOREIGN PATENT DOCUMENTS

| | | |
|---|---|---|
| EP | 2866052 | 4/2015 |
| JP | 2002354458 A | 12/2002 |

(Continued)

OTHER PUBLICATIONS

European Search Report for EP Application 17020155.2 dated Aug. 31, 2017.

(Continued)

*Primary Examiner* — Mohammad J Rahman
(74) *Attorney, Agent, or Firm* — Andrus Intellectual Property Law, LLP

(57) ABSTRACT

An object detection system for a marine vessel having at least one marine drive includes at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

15 Claims, 6 Drawing Sheets

(51) Int. Cl.
*G06N 3/02* (2006.01)
*G06T 7/70* (2017.01)

(52) U.S. Cl.
CPC .............. *G06K 2009/4666* (2013.01); *G06T 2207/30196* (2013.01); *G06T 2207/30244* (2013.01)

(56) References Cited

U.S. PATENT DOCUMENTS

| | | | | |
|---|---|---|---|---|
| 5,845,052 | A | * | 12/1998 | Baba .................... G05B 13/027 706/33 |
| 5,961,831 | A | | 10/1999 | Lee et al. |
| 6,273,771 | B1 | | 8/2001 | Buckley et al. |
| 6,354,892 | B1 | | 3/2002 | Staerzl |
| 6,382,122 | B1 | | 5/2002 | Gaynor et al. |
| 6,418,378 | B1 | * | 7/2002 | Nyland ................ G01V 1/3808 367/19 |
| 6,450,845 | B1 | | 9/2002 | Snyder et al. |
| 6,676,460 | B1 | | 1/2004 | Motsenbocker |
| 6,772,057 | B2 | | 8/2004 | Breed et al. |
| 7,036,451 | B1 | * | 5/2006 | Hutchinson ............. B63B 17/00 114/364 |
| 7,046,822 | B1 | | 5/2006 | Knoeppel et al. |
| 7,105,800 | B1 | | 9/2006 | Staerzl |
| 7,335,071 | B1 | | 2/2008 | Motsenbocker |
| 7,335,077 | B2 | | 2/2008 | Chiapetta |
| 7,476,862 | B2 | | 1/2009 | Staerzl |
| 7,511,276 | B2 | | 3/2009 | Staerzl |
| 7,630,806 | B2 | | 12/2009 | Breed |
| 7,753,745 | B2 | | 7/2010 | Schey et al. |
| 8,036,425 | B2 | | 10/2011 | Hou |
| 8,195,381 | B2 | | 6/2012 | Arvidsson |
| 8,271,155 | B2 | | 9/2012 | Arvidsson |
| 8,952,869 | B1 | | 2/2015 | Weaver et al. |
| 9,232,211 | B2 | | 1/2016 | Javidi et al. |
| 9,751,607 | B1 | * | 9/2017 | Kollmann .............. B63H 25/02 |
| 2005/0199171 | A1 | * | 9/2005 | Ecklund .................. B63B 59/08 114/222 |
| 2007/0217773 | A1 | * | 9/2007 | Droubie ................. G03B 17/08 396/25 |
| 2008/0046150 | A1 | | 2/2008 | Breed |
| 2009/0184865 | A1 | * | 7/2009 | Valo ........................ G01S 7/412 342/25 F |
| 2009/0276148 | A1 | | 11/2009 | Arvidsson |
| 2011/0043360 | A1 | | 2/2011 | Mintz et al. |
| 2012/0113274 | A1 | | 5/2012 | Adhikari et al. |
| 2012/0308124 | A1 | * | 12/2012 | Belhumeur ........ G06K 9/00281 382/159 |
| 2013/0201052 | A1 | * | 8/2013 | Saint Clair ........... G01S 17/023 342/54 |
| 2014/0355871 | A1 | * | 12/2014 | Mohamed ............ G06K 9/6256 382/159 |
| 2016/0119065 | A1 | * | 4/2016 | Tobias ................... G03B 17/08 348/81 |
| 2017/0068859 | A1 | * | 3/2017 | Qian .................. G06K 9/00637 |
| 2017/0278403 | A1 | * | 9/2017 | Pitcher ................ G01C 23/005 |
| 2017/0316573 | A1 | * | 11/2017 | Vicenzotti ................. G06T 7/70 |

FOREIGN PATENT DOCUMENTS

| | | |
|---|---|---|
| JP | 2005-031789 | 2/2005 |
| WO | 2014188463 | 11/2014 |

OTHER PUBLICATIONS

Japanese Office Action in corresponding JP Application No. 2017-084037 dated Aug. 22, 2017.

* cited by examiner

PERSON DETECTION IN A MARINE ENVIRONMENT

FIELD

The present disclosure relates to computer vision systems for marine vessels, and more specifically, to computer vision systems trained to detect objects.

BACKGROUND

The following U.S. patents and patent applications are hereby incorporated herein by reference.

U.S. Patent Publication No. 2012/0113274 discloses a system, method, and computer program product for automatically combining computer-generated imagery with real-world imagery in a portable electronic device by retrieving, manipulating, and sharing relevant stored videos, preferably in real time. A video is captured with a hand-held device and stored. Metadata including the camera's physical location and orientation is appended to a data stream, along with user input. The server analyzes the data stream and further annotates the metadata, producing a searchable library of videos and metadata. Later, when a camera user generates a new data stream, the linked server analyzes it, identifies relevant material from the library, retrieves the material and tagged information, adjusts it for proper orientation, then renders and superimposes it onto the current camera view so the user views an augmented reality.

U.S. Pat. No. 8,952,869 discloses examples of methods and systems for determining correlated movements associated with movements caused by driving a vehicle. In an example, a computer-implemented method includes identifying a threshold number of sets of correlated movements. The method further includes determining that the threshold number of sets of correlated movements is associated with movements caused by driving a vehicle. The method still further includes causing the wearable computing system to select a driving user interface for the wearable computing system.

U.S. Pat. No. 7,753,745 discloses status indicators for use with a watercraft propulsion system are described. An example indicator includes a light operatively coupled to a propulsion system of a watercraft, wherein an operation of the light indicates a status of a thruster system of the propulsion system.

U.S. Pat. No. 7,476,862 discloses two sensor units mounted on opposite sides of a transom of a boat and directed to a common location behind the boat. The field of view of the two sensors overlaps behind the marine propulsion unit of the boat to detect the presence of a heat emitting object, such as a mammal. Housing structures contain infrared sensing elements, lenses, and light shields. Signals from four infrared sensing elements are received by a controller which reacts, with an alarm signal, when at least two of the four sensors detect a heat emitting object within their individual fields of view. False triggering can be reduced by not providing an alarm signal if only the two most inboard sensors detect the heat emitting object.

U.S. Pat. No. 6,382,122 discloses an auto detect system is provided for a marine vessel in which the various associations and relationships between marine propulsion devices, gauges, sensors, and other components are quickly and easily determined. The system performs a method which automatically determines the number of marine propulsion devices on the marine vessel and, where needed, prompts the boat builder or marine vessel outfitter to enter various commands to identify particular marine propulsion devices with reference to their location on the marine vessel and to identify certain other components, such as gauges, with reference to both their location at a particular helm station and their association with a particular marine propulsion device.

U.S. Pat. No. 6,273,771 discloses a control system for a marine vessel incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, an object detection system for a marine vessel having at least one marine drive includes at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

One embodiment of a method of detecting a presence of one or more objects in a marine environment of a marine vessel includes training an artificial neural network to detect patterns associated with a predefined object in images of a marine environment. An image is then recorded with at least one image sensor positioned on the marine vessel, and the image is provided as input to the artificial neural network. The artificial neural network outputs detection information regarding a presence or absence of the object within the image.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Currently available safety systems on marine vessels are not intelligent and cannot detect the presence of persons in designated occupancy locations, such as whether there is a driver present at the helm (driver detection systems) or whether swimmers are present in an area around a marine vessel (swimmer detections systems). For example, many current driver detection systems for marine vessels require a driver, or operator, to wear a device that physically tethers them to the helm, such as a lanyard clip or a strap of some kind, or to wear a wireless device that wirelessly transmits or indicates the driver's presence at the helm. However, through research and investigation in the relevant field, the present inventors have recognized that these current systems are problematic because only a small percentage of operators use these driver detection systems, such as wear lanyard clips or wireless locator devices. Furthermore, currently available visual-based driver detection systems are typically based on motion detection and/or facial detection, each of which is problematic in context of detecting a driver on a marine vessel. Motion detection systems are prone to loosing track of a driver and producing false negatives when a driver is very still at the helm. Systems relying on facial detection are also prone to false negatives where a driver is not looking in the forward direction and/or is wearing protective gear on their face or head, such as sunglasses, a hat, a face mask, etc.

Additionally, through their research and investigation in the relevant field, the present inventors have recognized that currently available swimmer detection systems perform poorly at detecting people or other objects in the water around the marine vessel. Currently available swimmer and object detection systems perform poorly in marine environments, where the water partially or almost completely obscures the image of the person or object, whether it be a visible light image, an infrared image, or an image taken by other means. For example, often only a persons head, or head and shoulders, is visible of a person swimming in the water around a marine vessel. Accordingly, classic methods of person and/or object detection methods perform poorly and are unreliable due to error when implemented in marine environments.

Accordingly, there has been a long felt need in the marine vehicle and marine sporting applications for a system and method of reliably detecting the presence of people or other predetermined objects, such as floating debris or other obstacles, within a marine environment. In view of the inventors recognition of these and other problems with currently available swimmer or driver detection systems and methods and the need for reliable object detection in the relevant industry, the inventors developed the object detections systems and methods disclosed herein.

Figure 1:
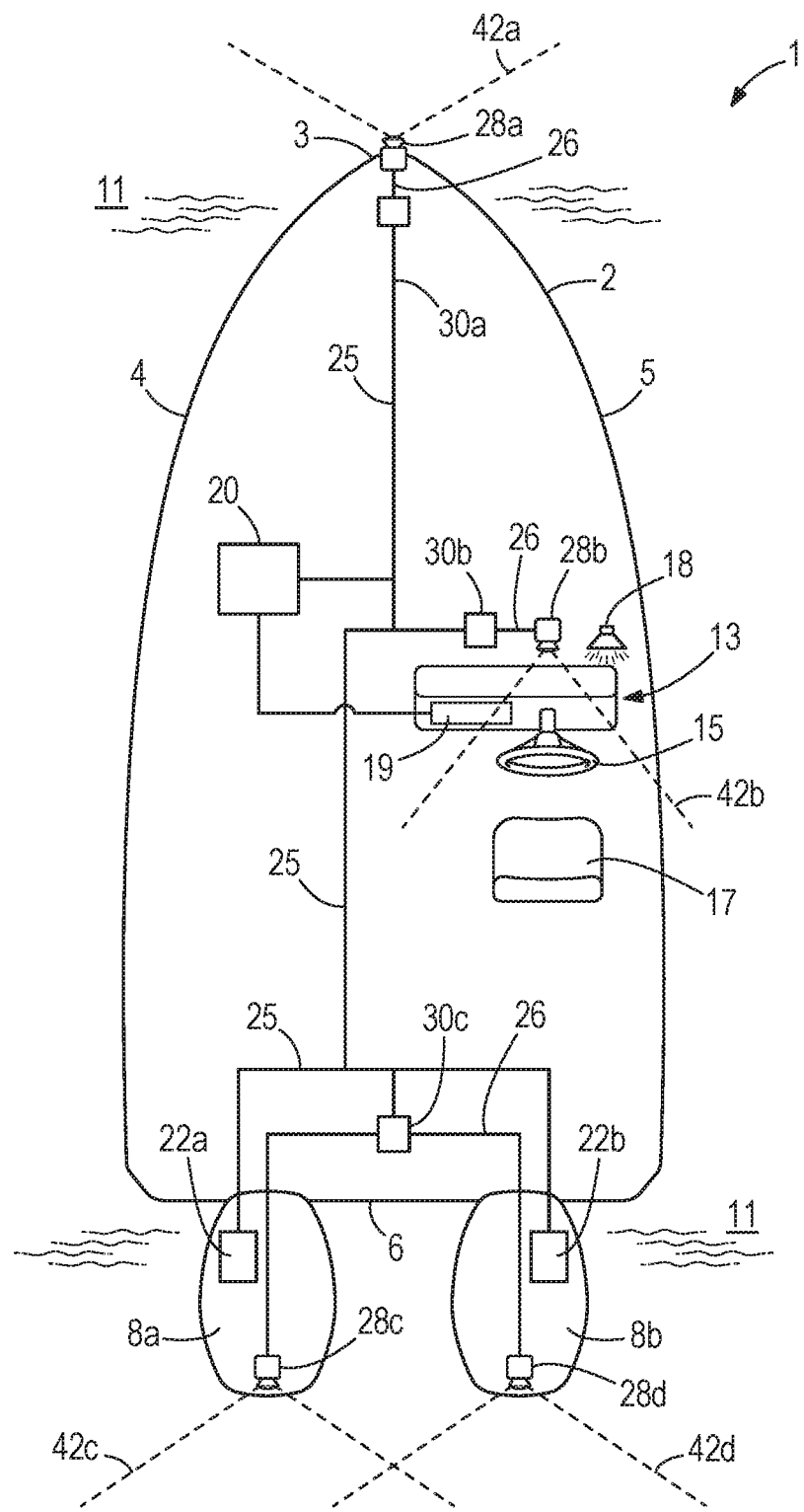
FIG. 1 is a schematic diagram representing one embodiment of a marine vessel having an object detection system.

FIG. 1 schematically depicts an exemplary embodiment of an object detection system 1 on a marine vessel 2. The marine vessel 2 has a port side 4 and a starboard side 5, a bow 3 and a stern 6. The marine vessel 2 is equipped with two marine drives 8a and 8b at the stern 6, with marine drive 8a positioned toward the port side 4 and marine drive 8b toward the starboard side of the marine vessel 2. Each marine drive 8a and 8b is controlled by a respective powertrain computer 22a, 22b, as will be known to a person having ordinary skill in the relevant art. The powertrain computers 22a and 22b are in communication with a helm computer 20 via CAN bus 25, which may control functions of devices at the helm 13 and process and coordinate communications to the powertrain computers 22a, 22b of the marine drives 8a, 8b. The marine vessel 2 has a helm 13 having an input device 15, which is shown as a steering wheel but could also or alternatively include a joy stick, track pad, throttle lever, and/or any other user input device available in the art for providing throttle or steering input to control the marine vessel 2. A display 19 is also provided at the helm 13, which may be any digital or other display that provides a visual depiction of information relating to the marine vessel 2, such as boat speed, engine status, fuel levels, direction, etc. For example, the helm computer 20 may track and/or control the multitude of subsystems on the marine vessel 2 and may control the display 19 to display information pertaining to the marine vessel 2 and/or its subsystems. To provide one example, the display 19 may be a VesselView display by Mercury Marine Corporation of Fond du Lac, Wis. Furthermore, a speaker 18 may also be provided at the helm 13 for providing audible output, such as to be audible by a person standing at the helm 13.

It should be understood that the concepts disclosed in the present disclosure are applicable to any type or size of marine vessel having any number of marine drives and any configuration of a propulsion device, such as a propeller, impeller, pod drive, and the like, which may be driven by any motor or engine, such as an outboard motor, an inboard drive, or an inboard/outboard drive (or stern drive), as will be apparent to those of ordinary skill in the art. Additionally, a multitude of various control arrangements for the marine drive(s) on a marine vessel, and for coordination of sensors and auxiliary devices with the function of the marine drive(s), are well known in the art. The embodiments of marine vessels, marine drives, and control arrangements therefor are shown and described herein for purposes of exemplifying the systems and methods disclosed herein, and should not be considered limiting.

The marine vessel 2 is further equipped with several image sensors 28 that sense images of a marine environment on or around the marine vessel 2. A forward image sensor 28a is positioned to capture an image of an area in front of the marine vessel 2, such as positioned on the end of the bow 3 or at some location at the front of the hull of the marine vessel 2 to capture images of the water surface 11 in front of the marine vessel 2. A helm image sensor 28b is positioned to capture an area at the helm 13 where an operator would be located to operate the marine vessel 2—i.e., the helm area. For example, the helm image sensor 28b may be positioned in an area in front of the input device 15, such as a steering wheel and/or joystick, and the chair 17. The helm image sensor 28b is positioned, for example, such that a person sitting on the chair 17 and/or operating the input device 15 and/or looking at the display 19 would be within the image captured by the helm image sensor 28b. Two rear image sensors 28c and 28d are provided to capture images of an area behind the marine vessel 2. In the depicted embodiment, the rear image sensor 28c is mounted on the marine drive 8a, and the rear image sensor 28d is positioned on the marine drive 8b. For example, the rear image sensors 28c, 28d may be mounted on the housing of the marine drives 8a, 8b, such as on a top or rear portion of the housing. In other embodiments one or more rear image sensors 28c, 28d may be mounted on the stern 6 of the marine vessel, or otherwise positioned to capture all or a portion of the area behind the marine vessel 2. In still other embodiments, image sensors may be positioned to capture some other area(s) around the marine vessel 2, such as an area on the water surface 11 near the port side 4 or starboard side 5 of the marine vessel 2.

Each image sensor 28a-28d may be equipped to sense and image the marine environment on and/or around the marine vessel 2 by any means. Image sensors 28a-28d may include visual image sensors—e.g. cameras that sense visual light to create still images or video images—infrared image sensors, sonar image sensors, radar image sensors, etc. Each image sensor 28a-28d has a field of view 42a-42d, respectively, which is the area captured, or imaged, by the respective image sensor 28a-28d. Each image sensor 28a-28d is connected to a computer 38a-30c equipped to process the images from the respective image sensors 28a-28d. In the exemplary embodiment, the images from each of the image sensors 28a-28d are transferred to a designated computer 30a-30c by an image bus 26, which is a data connection between the respective image sensor 28a-28d and its associated computer 30a-30d. In various embodiments, each image sensor 28a-28d may have its own dedicated computing system. Such an arrangement is exemplified in the embodiment of FIG. 1, where the forward image sensor 28a is provided with image computer 30a to process the images therefrom, and the helm image sensor 28b is provided with image computer 30b to process the images therefrom. In other embodiments, two or more image sensors may be associated with a single computer. This arrangement is also exemplified in the context of FIG. 1, where each of the rear image sensors 28c and 28d is connected to a single image computer 30c, which processes the images captured by both sensors. In other embodiments, each rear image sensor 28c and 28d may be provided with its own image computer. A multitude of other arrangements between image sensors 28 and computers 30 is possible. For example, an embodiment is contemplated where a single image computer 30 is provided for all image sensors 28 (e.g., 28a-28d) on the marine vessel 2, and thus processes all of the images captured therefrom. As disclosed herein, in such an embodiment the image computer 30 may be trained based on the marine environment captured by each of the associated image sensors 28a-28d, or may be trained for object detection in a marine environment generally. Output from the image computer is provided on the CAN bus 25 so that it may be received by various devices within the system, including the powertrain computers 22a, 22b and helm computer 20. In still another embodiment, the image processing function for one or more of the image sensors 28a-28d may occur on or be integrated into the helm computer 20.

Figure 2:
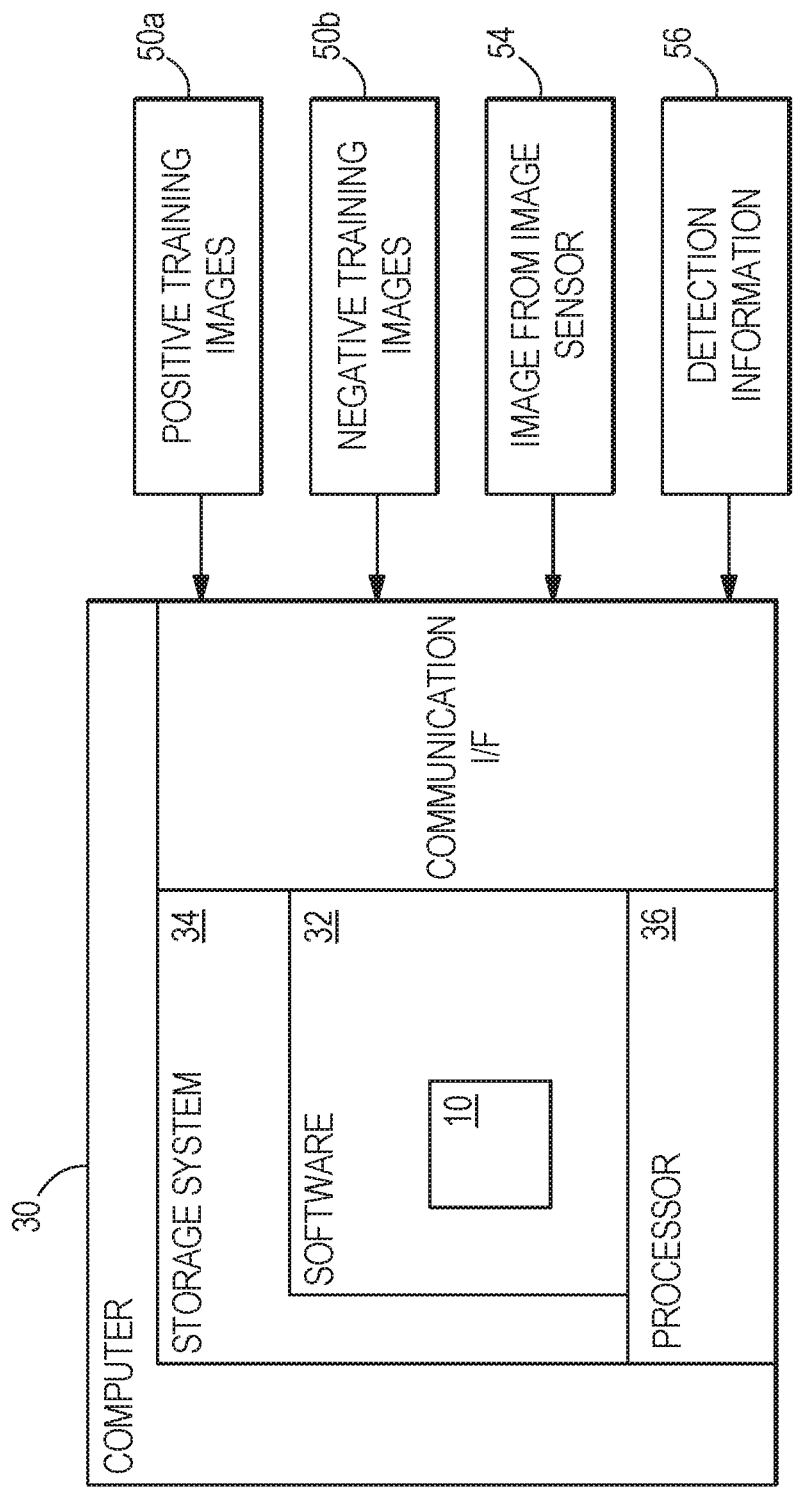
FIG. 2 schematically depicts one embodiment of a computing system in the object detection system.

FIG. 2 depicts one embodiment of a computer 30 for receiving and processing images from one or more image sensors 28a-28d. The computer 30 has software 32 stored in storage system 34. The software 32 includes image scanning module 10 that includes an artificial neural network trained to detect patterns associated with one or more predefined objects within the image 54 received from the one or more image sensors 28a-28d. The image scanning module 10 includes executable software instructions, or computer-readable code, and the trained neural network, which is stored in storage system 34 and, when executed on processor 36, direct the processor to operate as described herein.

Although the computer 30 depicted in FIG. 2 includes one software 202 encapsulating one image scanning module 10, it should be understood that one or more software elements having one or more modules may provide the same operation. Similarly, while description as provided herein refers to a computer 30 having a single processor 36, it is to be recognized that implementations of such systems can be performed using one or more processors, which may be communicatively connected, and such implementations are considered to be within the scope of the description. Likewise, the computer 30 and processor 36 may be the same computer and processor performing the function of the helm computer 20 or the powertrain computer(s) 22a, 22b.

The processor 36 can comprise a microprocessor and other circuitry that retrieves and executes software 32 from storage system 34. Processor 36 can be implemented within a single processing device but can also be distributed across multiple processing devices or sub-systems that cooperate in executing program instructions. Examples of processor 36 include general purpose central processing units, applications specific processors, and logic devices, as well as any other type of processing device, combinations of processing devices, or variations thereof.

The storage system 34 can comprise any storage media, or group of storage media, readable by processor 36, and capable of storing software 32. The storage system 34 can include volatile and non-volatile, removable and non-removable media implemented in any method or technology for storage of information, such as computer-readable instructions, data structures, program modules, or other data. Storage system 34 can be implemented as a single storage device but may also be implemented across multiple storage devices or sub-systems. Storage system 34 can further include additional elements, such a controller capable of communicating with the processor 36.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. Likewise, the storage media may be housed locally with the processor 36, or may be distributed in one or more servers, which may be at multiple locations and networked, such as in cloud computing applications and systems. In some implementations, the storage media can be a non-transitory storage media. In some implementations, at least a portion of the storage media may be transitory.

The artificial neural network of the image scanning module 10 receives an image 54 and outputs detection information 56 regarding a presence of one or more objects within the image. For example, the detection information 56 may indicate a probability value of the presence of a predefined object, such as a person, within the image. The image scanning module 10, including the artificial neural network, is executed on processor 36 within the computer 30.

As will be understood by a person having ordinary skill in the relevant art reviewing this disclosure, an artificial neural network (ANN) refers to a layered structure, with linear or nonlinear units, which can be trained by different optimization methods to minimize defined error function, and can be generated from a large number of inputs. ANNs are generally presented as systems of interconnected processing elements ("neurons") which exchange messages between one another. The connections between the neurons have numeric weight that can be tuned based on input to the system and/or based on feedback to the system, depending on the type of ANN, making ANNs adaptive to inputs and capable of learning from examples. For example, the image scanning module 10 may include a feed-forward ANN. Feed-forward ANNs tend to be straightforward networks that associate inputs with outputs. This type of organization is also commonly referred to as "bottom-up" or "top-down" ANNs. For example, the ANN may consist of three or more groups, or layers, of processing units: a layer of "input" units connected to a layer of "hidden" units, which is in turn connected to a layer of "output" units.

The activity of the input units represents the raw information that is fed into the network. In this instance, the raw information is training images, which may include positive training images 50*a* of relevant marine environments that contain the object detected, and negative training images 50*b*, which are images of the relevant marine environment not containing the predefined object. The ANN may be trained to detect any type of predefined object, depending on the training images 50*a*, 50*b* provided to it. In exemplary embodiments may be trained to detect the presence of a person, a predefined marine animal, or a floating debris object of a predefined size range by providing training images of the respective predefined objects. For example, the ANN may be trained using a supervised learning algorithm, such as ground truth training. Supervised learning algorithms incorporate an external teacher so that each unit is told what its desired response should be to a particular input. For example, the positive training images 50*a* are inputted into the ANN along with a positive identification of the object within the image. Similarly, the negative training images 50*b* are inputted into the ANN with an indication that the object is not in that image, and thus that the output value should be a 0. In other words, the training occurs based on existing sets of training images of relevant marine environments having correctly-identified the presence or absence of the predefined object or objects within those training images, which are used as examples upon which a pattern is defined within the ANN, such as within the "hidden" units of the ANN.

A region of interest 48 containing the predefined object (which is exemplified in FIGS. 3A-3C and 4A-4B as a person 46) may be identified for each positive training image 50*a*. For example, the region of interest 48 identification may be a cutout directly around the predefined object that the ANN is being trained to detect. More specifically, the region of interest 48 identification may identify the x and y coordinates of the pixels within the image that cover the object. The ANN will analyze that region and, over the course of receiving multiple positive and negative training images 50*a* and 50*b*, will learn a pattern, or set of patterns, that can be used to detect the predefined object within any image of that marine environment. The ANN is trained using additional positive training images 50*a* and negative training images 50*b* until the error between the desired output and the actual output is sufficiently reduced such that the resulting ANN can reliably detect the presence of the predefined image within the marine environment in which it operates.

In one embodiment, positive training images 50*a* may be supplied to the ANN that show only a part of a larger image, such as images created by sub-dividing an image comprising a large object into different sub-images, each containing a part of the larger object. For example, an image of a person could be divided into five or six different sub-images, such as an image of each leg region, an image of each arm region, and an image of the person's head and neck. Each of these images of particular body parts of a person are provided as positive training images 50*a* to the ANN, with the relevant region of interest identified. Similarly, multiple regions of interest 48 may be identified one picture, and a positive training image 50*a* created containing each of these regions of interest 48. Accordingly, the ANN can be trained to detect the presence of a person based on identification of only a small portion of the person within an input image. This is important in marine environments, such as images take above a water surface, where it is common for only a small portion of the predefined object to be visible.

Figure 3A:
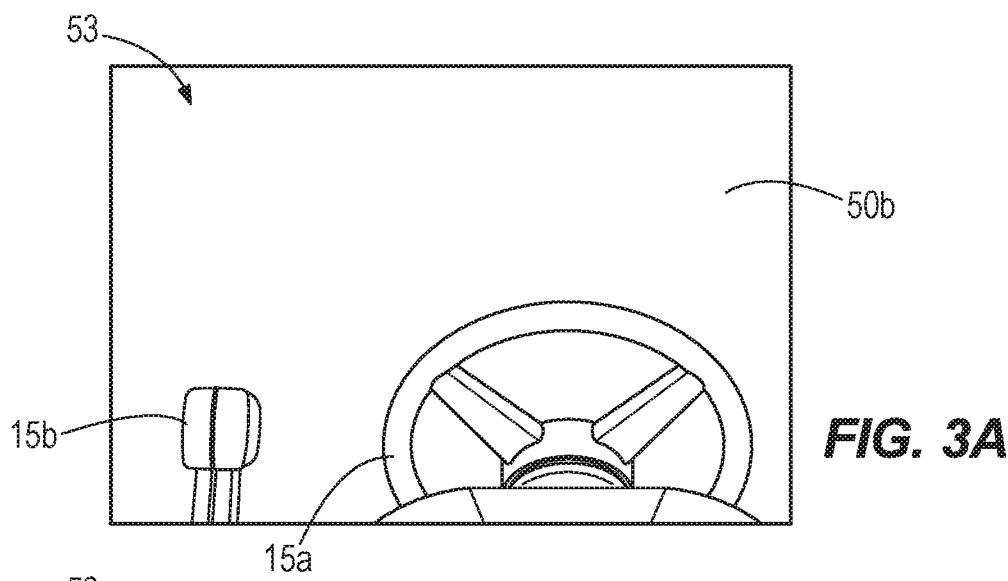
FIGS. 3A, 3B, and 3C depict various embodiments of training images for training an object detection system.
Figure 3B:
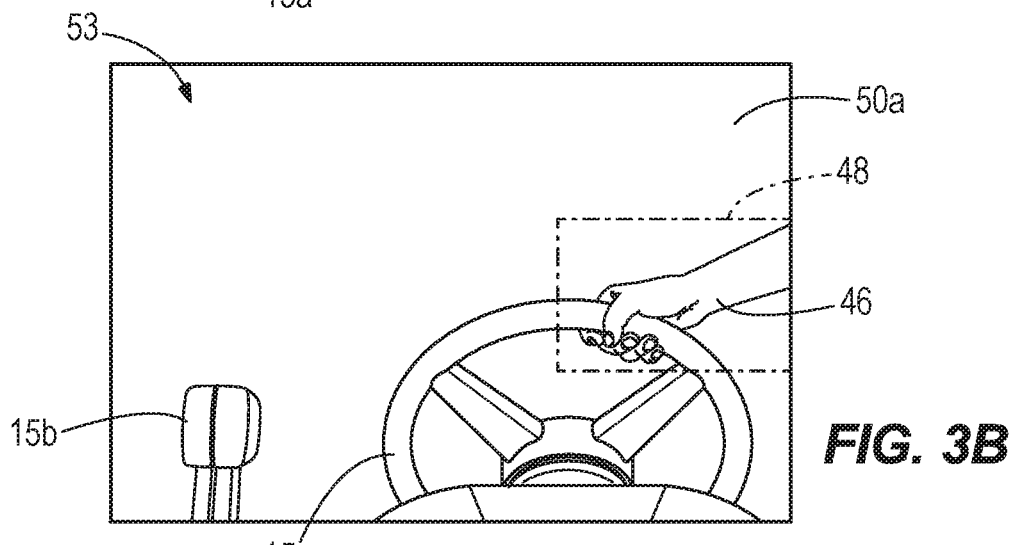
Figure 3C:
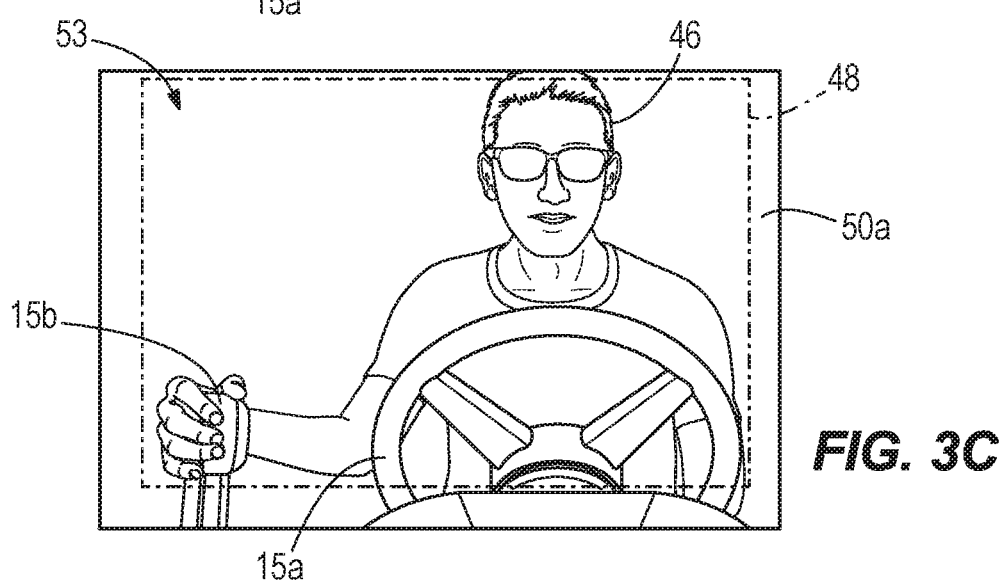

FIGS. 3A-3C provide exemplary training images that illustrate this point. FIG. 3A is a negative training image 50*b* of a helm area 53 that does not contain the predefined object of a person 46. The training images 50*a*, 50*b* may be, for example, photographs or single frames captured by a video camera. The negative training image 50*b* of the helm area 53 does contain two input devices, including a steering wheel 15*a* and throttle lever 15*b*. FIGS. 3B and 3C depict positive training images 50*a* of the helm area 53. FIG. 3B has a region of interest 48 identified containing a hand of a person 46 on the steering wheel 15*a*. The positive training image 50*a* of FIG. 3C has a region of interest 48 identified therein containing an entire upper body of a person 46. In another embodiment, the image of FIG. 3C can be subdivided into multiple positive training images 50*a*, such as one training image with a region of interest 48 over the person's 46 hand on the throttle lever input device 15*b* and another positive training image 50*a* with a region of interest 48 including the person's 46 head and/or shoulders. Accordingly, the relevant ANN can be trained to detect the presence of a person 46 (or the likely presence of a person 46) by just identifying one portion, such as the hand, the head, or the shoulders.

In accordance with the above, the inventors have recognized that due to the complexity of object recognition in certain marine environments, it is beneficial to train the ANN to recognize the predefined objects within the particular marine environment captured by the image sensor 28*a*-28*d*. Thus, the training images 50*a*, 50*b* may be comprised partly or entirely of images similar to or the same as the marine environment captured by the image sensor. For example, the ANN of the image scanning module 10 configured to process images from the helm image sensor 28*b* may be trained partly or entirely using images of that helm configuration within the field of view 42*b*, such as is exemplified in FIGS. 3A-3C. For example, the training images 59*a*, 50*b* may be of helm areas 53 of the same vessel model and/or containing the same input devices 15*a*, 15*b* in the same arrangement as will be provided within the field of view 42*b* of the helm image sensor 28*b*. Thus, the ANN is trained specifically to process the images from the helm image sensor 28*b* and can learn to recognize portions of the helm 13 of the particular marine vessel 2, and how the person 46 will interact with these portions of the helm 13, leading to more reliable object detection.

This tailored training to a specific marine environment may be extremely important to creating a system 1 capable of reliable object detection on the water surface 11 surrounding the marine vessel 2. For example, the ANNs that process the images from the forward image sensor 28*a* and the rear image sensors 28*c* and 28*d* may be trained to detect predefined objects that are likely to pose a hazard at that particular location, and may be trained on images that depict that object in all of the positions or forms that it is likely to appear within the captured image. For example, the ANN of the respective image scanning module 10 may be trained using training images that approximate the view angle and/or field of view that will be captured by the respective image sensor 28*a*-28*d*. This concept is exemplified in FIGS. 4A and 4B, where an image sensor 28 is mounted to capture an image of an area behind the marine vessel 2. In each of the depicted embodiments, the image sensor has a view angle 44 with respect to the parallel axis 45. The predefined object will appear differently within the image captured by the image sensor 28 depending on the view angle 44 and field of view 42 of the respective image sensor 28. The predefined object, in this case a person 46, would appear different in the image captured by image sensor 28 of FIG. 4A compared to an image captured by image sensor 28 in FIG. 4B.

Figure 4A:
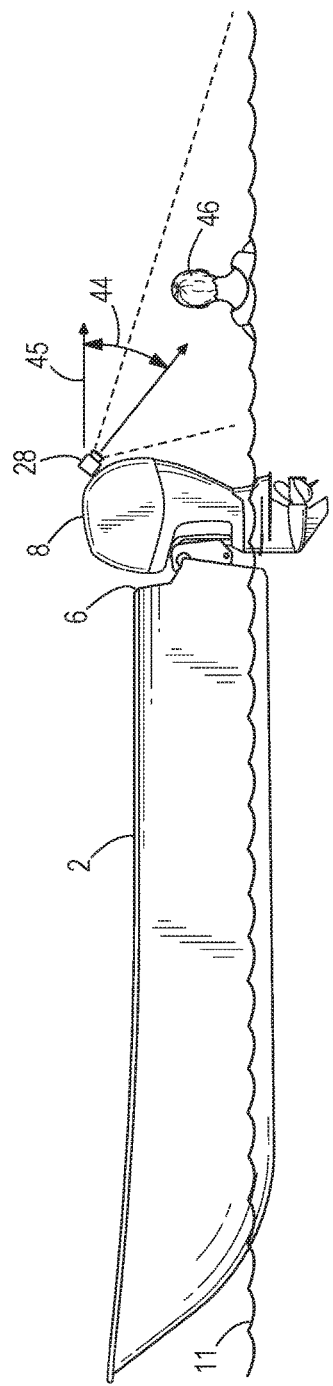
FIG. 4A depicts one embodiment of an image sensor of an object detection system installed on a marine vessel.
Figure 4B:
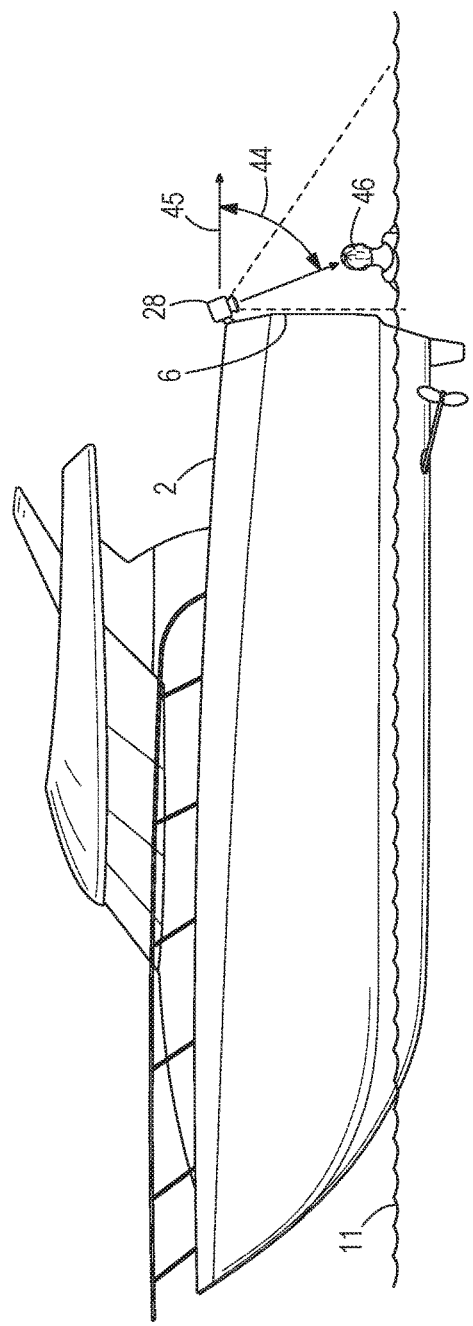
FIG. 4B depicts another embodiment of an image sensor of an object detection system installed on a marine vessel.

In FIG. 4A the image sensor 28 in is mounted on a rear corner of an outboard marine drive 8 of a smaller marine vessel 2. In FIG. 4B the image sensor 28 is mounted on a top portion of the stern 6 of a large yacht, and thus the view angle 44 with respect to the parallel axis 45 is different than that of the image sensor 28 on the marine vessel 2 of FIG. 4A. Accordingly, the person 46 will appear differently in the marine environment captured by image sensor 28 in FIG. 4A than the marine environment captured by image sensor 28 in FIG. 4B. For example, the person 46 in the image captured by image sensor 28 in FIG. 4A will be closer to the image sensor 28, and thus will appear larger. Moreover, the view angle 44 of FIG. 4A will be closer to horizontal than that of FIG. 4B, which will be more of a downward-looking angle. Accordingly, the images of the environment captured by the image sensor 28 in FIG. 4A are more likely to contain facial features, for example, than those in the marine environment captured by image sensor 28 in FIG. 4B. The images of the marine environment captured by image sensor 28 of FIG. 4B may be more likely to contain more body parts of the person 46 because more will be visible from the downward-looking view angle 44. Likewise, the water surface 11 will also appear differently in each of the respective marine environments. Accordingly, images at the appropriate view angles 44 may be provided to the ANN of the respective image scanning module 10 that will process images from the respective one of these image sensors 28.

Thereby, the respective ANNs can be trained to determine what a person 46 (or other predefined object) looks like in that marine environment, and to decipher the person 46 from the features on the water surface 11 in that environment. Further, the training may account for the various viewing angles 44 that may be caused by motion of the marine vessel 2 in the water, and may even be trained for specific marine applications, such as small lake environments versus ocean environments where large waves may be present. Likewise, the ANNs may be trained for the specific type of marine application that the respective marine vessel 2 is likely to be used. For example, a small marine vessel 2, such as that depicted in FIG. 4A, that is likely to be used in sporting applications may be trained to detect swimmers, skiers, tubers, etc. An ANN intended for a larger marine vessel, such as a sea-worthy yacht, might be trained to identify objects or people in different environments, such as in a small paddle boat in an area in front of the marine vessel 2.

In other embodiments, the ANN for the image scanning module 10 may be trained to detect one or more of certain predefined object(s) in a marine environment more generally and may be provided with training images 50 from a multitude of different viewing angles and in different marine environments.

Through their experimentation and research in the relevant field, the present inventors have recognized that this type of training for marine environments in general, and preferably for specific marine environments, is necessary for reliable object detection, especially for detecting predefined objects on the water surface 11 using image sensors 28 positioned to capture images surrounding the marine vessel because the marine vessel 2 is moving within the water along multiple axes, including roll, pitch, and yaw, which each affect the view angle and thus the appearance of the object within the captured image. Accordingly, object detection in a marine environment is different than in other environments, such as automotive environments where the view angles are more consistent and the objects are detected on a relatively flat plane. Furthermore, in automotive applications, for example, there are certain environmental markers, or queues, that are available, such as roadside detection, that are relied upon to assist in object detection. Such spatial queues are not available in marine environments, and thus the inventors found that the training requirements for ANNs to reliably detect objects in a marine environment are different than those for automotive environments, security environments, etc.

The image sensor 28 may be any of various types of sensors for imaging an environment. For example, the image sensor 28 may be a visual light camera or an infrared camera. To provide just two examples, each image sensor 28 may be a Logitech C910 Camera by Logitech International S.A. of Switzerland, or each image sensor 28 may be an Axis F1035-E Sensor Unit by Axis Communications AB of Sweden. In an embodiment incorporating one or more Axis F1035-E Sensor Unit image sensor(s) 28, which has a fisheye lens, the ANN may be trained to process images taken by such a lens or the images may be digitally cropped and de-warped prior to processing by an ANN not trained to process fisheye images. The ANN for the image scanning module 10 that processes the image is trained for detecting the patterns associated with the predefined object as it appears in the type of image captured by the image sensor 28. Thus, an ANN that processes images from a visual light camera is trained using visual light training images 50*a*, 50*b*, and an ANN that processes images from an infrared camera will be trained using infrared training images 50*a*, 50*b*. In still other embodiments where the image sensors 28 are sonar sensors or radar sensors, and the respective ANNs are trained based on sonar training images or radar training images, respectively.

However, through experimentation and research regarding image detection of infrared images, the present inventors have recognized that object detection using infrared can be difficult in certain environments because the water distorts and obscures the temperature of the object, and in some environments it may be difficult to differentiate temperature patterns of specific objects in a marine environment. The inventors have recognized that appropriate ANNs for object detection in specific temperature environment(s) may alleviate some of these issues. However, for certain marine environments, visual light camera image sensors 28 may be preferable and provide superior performance over infrared camera image sensors 28.

Figure 5:
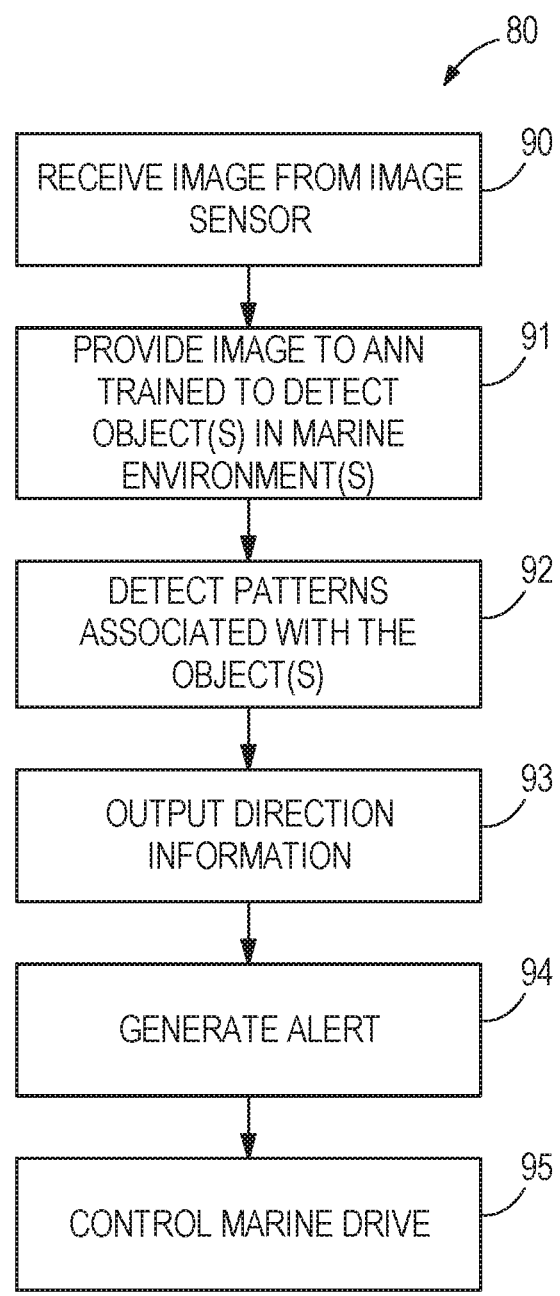
FIG. 5 is one embodiment of a method of detecting objects present in an environment of a marine vessel.

FIG. 5 depicts one embodiment of a method 80 of detecting one or more predefined objects present in an environment of a marine vessel 2. An image is received at step 90 from an image sensor 28. The image is provided to an ANN trained to detect the one or more predefined objects in a marine environment at step 91. At step 92, patterns associated with the predefined objects are detected within the image by the ANN. The detection information is outputted by the ANN at step 93. To provide one example, an ANN trained to detect the presence of a person 46 in a marine environment may output detection information 56 as a percentage, or probability, that there is a person in the frame, or image, captured by the image sensor 28.

The detection information may then be used by systems or elements on the marine vessel 2 to generate an alert to an operator of the marine vessel and/or to control one or more marine drives 8a, 8b on the marine vessel 2. As described above, the detection information 56 may be provided onto the CAN bus 25, and thus received at any of various computers or control devices connected on that CAN bus 25. To provide just one example, the helm computer 20 may determine that a hazardous condition exists based on the detection information 56 provided on the CAN bus 25, and may control the display 19 and/or a speaker 18 at the helm 13 to generate a visual and/or auditory alert to the user of the hazardous condition. For example, the display 19 can be controlled to alert the user to the particular object detected and its position with respect to the vessel.

Likewise, the detection information 56 can be used at step 95 to control one or more marine drive(s) 8a, 8b. For example, the powertrain computers 22a, 22b may be configured to take certain actions based on the receipt of certain detection information 56 in order to control the marine drives. For example, the powertrain computers 22a, 22b may be configured to treat the detection information 56 as a control input to the engine control algorithm, such as having a lookup table that associates control actions with the detection information 56. For example, the marine drive may be immediately put into a neutral gear upon receipt of detection information 56 indicating that a person is in the water near the marine vessel 2, such as a 95% probability that there is a person within a particular field of view or area of interest within the field of view. For example, the powertrain computers 22a, 22b may be configured to react to a high probability detection of a person 46 or other predefined object within the image captured by the forward image sensor 28a by immediately putting the marine drives 8a, 8b into neutral, or even reverse.

The output from the image computer 30b associated with the helm image sensor 28b would be treated differently in that the absence of person detection within the image may be treated as a control input that incites a control action to generate an alert at step 94 and/or take control action with the marine drives 8a, 8b. For example, if no person 46 is detected within the image captured by the helm image sensor 28b for a predetermined number of frames or predetermined amount of time, the powertrain computers 22a, 22b could, for example, slow down the engine speed of the respective marine drives 8a, 8b and/or shift the marine drives 8a, 8b into a neutral gear. In one embodiment, the powertrain computers 22a, 22b may be configured to take additional, progressive action upon continued failure to detect a person 46 within the image from the helm sensor 28b, which may even include shutting off the engine after a number of frames with no person detection or period of time of no person detection. For example, a control algorithm may include a filter mechanism in place such that a certain control output is made after a certain number of detection information values that reach a particular threshold, and then to take another action upon subsequent detection information values 56. The filtering mechanism could be calibratable for certain applications and/or certain marine vessels.

Figure 6:
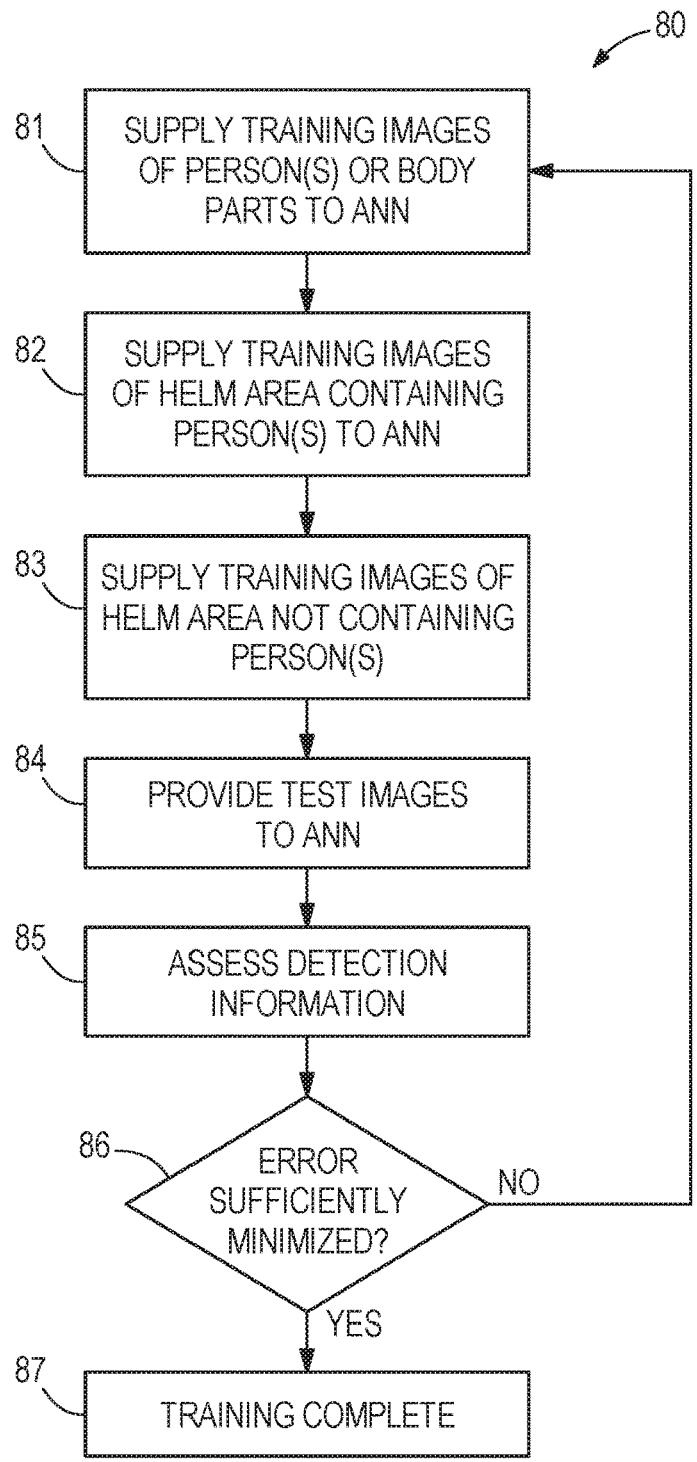
FIG. 6 is a flowchart depicting one embodiment of a method of training an artificial neural network to detect patterns associated with one or more predefined objects.

FIG. 6 depicts one embodiment of a method of detecting one or more objects present in a marine environment on or around a marine vessel 2, and specifically regards steps for training an ANN to detect patterns associated with one or more predefined objects in images of a marine environment. At step 81, positive training images containing one or more persons or body parts of persons are supplied to the ANN. At step 82, further training images are supplied to the ANN that are specific to the marine environment that will be captured by the image sensor 28 providing input to the ANN. In the depicted example, the ANN is trained to process images from a helm image sensor 28b, and thus training images specific to the helm area captured by the image sensor 28b are provided at steps 82 and 83 to tailor the training of that ANN for accurately processing images from the helm image sensor 28b. At step 82, positive training images of the helm area 53 containing a person 46, or some portion of a person 46, are supplied to the ANN. Negative training images of the helm area 53 are supplied at step 83—i.e., images that do not contain a person. The performance of the ANN at person detection is tested at steps 84-86 to determine whether further training is necessary. At step 84, test images are provided to the ANN and the resulting output, the detection information 56, is assessed at step 85. At step 86, it is determined whether the error has been sufficiently minimized to provide reliable person detection in the respective marine environment—i.e., the helm area. If the error is too large, then further training may be provided at steps 81-83. If the error is sufficiently low, then the training is deemed completed at step 87. Similar training methods may be provided for other marine environments, such as training for detection of persons or other predefined objects in an area in front of the marine vessel 2 captured by forward image sensor 28a or an area behind the marine vessel 2 captured by one or more rear image sensors 28c, 28d. In such embodiments, positive and negative training images of relevant marine environments, such as images with the same view angle and/or field of view as images by the respective image sensor 28a, 28c, 28d.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. An object detection system for a marine vessel having at least one marine drive, the object detection system comprising:
   at least one image sensor positioned on the marine vessel and configured to capture an image of a first marine environment around the marine vessel, wherein the first marine environment is a water surface behind the marine vessel and the at least one image sensor is a visible light camera positioned on the marine vessel at an angle and distance from the water surface;
   a processor; and
   an image scanning module executable on the processor and configured to receive the image as input and output information regarding a presence or absence of a person located in the first marine environment, the image scanning module comprising an artificial neural network trained to detect patterns within the image of the first marine environment associated with a person located behind the marine vessel, and to output detection information regarding the presence or absence of the person within the image of the first marine environment;

wherein the artificial neural network of the image scanning module is trained using positive and negative training images of objects on a water surface having a range of view angles and fields of view that approximate the angle and distance from the water surface of the image sensor positioned on the marine vessel.

2. The object detection system of claim 1, wherein the detection information indicates a probability value of the presence of the person within the image.

3. The object detection system of claim 1, wherein the artificial neural network of the image scanning module is trained using positive training images of persons on a water surface having the range of view angles and/or fields of view.

4. The object detection system of claim 1, further comprising
a second image sensor positioned on the marine vessel and configured to capture a second image of a second marine environment being a second water surface around the marine vessel, wherein the second marine environment is at a different position with respect to the marine vessel than the first marine environment and the second image sensor is positioned on the marine vessel at an angle and distance from the second water surface;
a second processor; and
a second image scanning module executable on the second processor, the second image scanning module including a second artificial neural network trained to receive the image of the second marine environment as input and output second detection information regarding the presence or absence of one or more predefined objects within the second image, wherein the second artificial neural network of the second image scanning module is trained using positive and negative training images of objects on a water surface having a range of view angles and fields of view that approximate the angle and distance from the second water surface of the second image sensor positioned on the marine vessel.

5. The system of claim 4, further comprising a powertrain control unit configured to receive the detection information from the first image scanning module and the second image scanning module and to generate a control instruction to the marine drive based on the detection information.

6. The system of claim 4, wherein the second image sensor is a visible light camera positioned on the marine vessel and the second marine environment is a water surface of an area in front of the marine vessel, and wherein the image scanning module is further configured to output the detection information regarding the presence of at least one of the person, a predefined marine animal, or a floating debris object of a predefined size range located in the area in front of the marine vessel.

7. A method of detecting a presence of one or more objects in a marine environment of a marine vessel, the method comprising:
determining a range of view angles and fields of view that approximate an angle and distance from a water surface of an image sensor positioned on the marine vessel;
training an artificial neural network to detect patterns associated with a predefined object in images of a marine environment imaged by the image sensor, wherein the training includes:
providing positive training images of the predefined object on a water surface from view angles or fields of view that are within the range of view angles and fields of view of the image sensor;
providing negative training images of objects other than the predefined object on a water surface from view angles or fields of view that are within the range of view angles and/or fields of view of the image sensor;
recording an image with the image sensor positioned on the marine vessel;
providing the image as input to the artificial neural network; and
outputting detection information regarding a presence or absence of the object within the image.

8. The method of claim 7, wherein the detection information includes a probability of the presence of the predefined object in the image.

9. The method of claim 7, further comprising sending the detection information via a CAN bus to a powertrain control unit, and controlling at least one marine drive with the powertrain control unit based on the detection information.

10. The method of claim 7, further comprising generating an alert on the marine vessel based on the detection information.

11. The object detection system of claim 3, wherein the artificial neural network of the image scanning module is trained using negative training images of objects other than persons on a water surface having the range of view angles and/or fields of view.

12. A driver detection system for a marine vessel having at least one marine drive, the driver detection system comprising:
at least one image sensor positioned on the marine vessel and configured to capture an image of a helm area on the marine vessel, wherein the at least one image sensor is a visible light camera positioned to image the helm area;
a processor; and
an image scanning module executable on the processor and configured to receive the image as input and output detection information regarding a presence or absence of a person located in the helm area, the image scanning module including an artificial neural network trained to detect patterns within the image associated with a person in the helm area, and to output the detection information regarding the presence or absence of the person located in the helm area.

13. A driver detection system of claim 12, wherein the artificial neural network of the image scanning module is trained for person detection in a particular helm area using training images of a same vessel model as the helm area or a same arrangement of vessel control input devices as the helm area.

14. The system of claim 1, wherein the range of view angles and fields of view of the training images approximate a view angle range or distance range of the image sensor from the water surface caused by motion of the marine vessel with respect to the first marine environment.

15. The method of claim 7, wherein the range of view angles and fields of view of the training images approximate a view angle range or distance range of the image sensor from the water surface caused by motion of the marine vessel with respect to the first marine environment.

* * * * *